Oct. 6, 1936.                R. S. TROTT                2,056,237
                           ENGINE MOUNTING
                         Filed Nov. 30, 1931
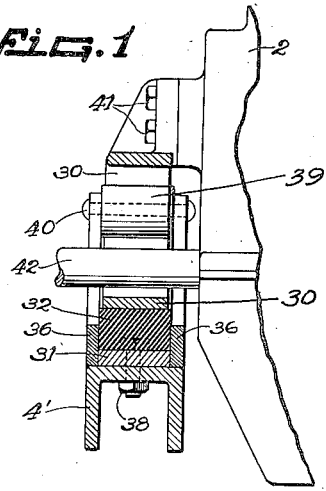
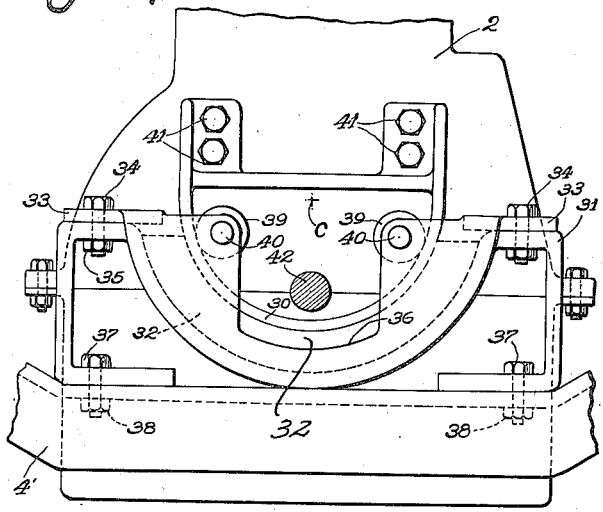
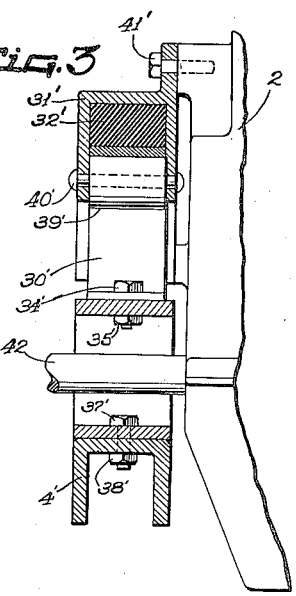
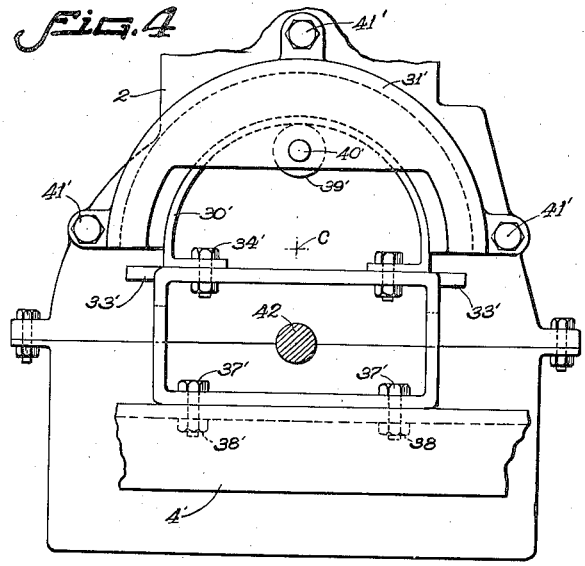
Inventor
Rolland S. Trott
his Attorney Patented Oct. 6, 1936

2,056,237

UNITED STATES PATENT OFFICE 2,056,237

ENGINE MOUNTING

Rolland S. Trott, Denver, Colo.

Application November 30, 1931, Serial No. 578,107

15 Claims. (Cl. 248—7)

My invention relates to engine mountings for mounting engine units upon their frames or supports so as to provide force cushioning and pivotal movements between the unit and its support, and is an improvement over my invention on Engine mountings, the application for patent on which was filed May 27, 1929, Serial No. 366,406, now Patent No. 1,834,907, Dec. 1, 1931.

My improved engine mounting embodying this invention comprises a cradle and seat, one secured to the frame and the other secured to the engine unit, with a rubber cushion between opposing surfaces thereof and a rebound member carried either by the cradle or seat, and cooperating with a surface of the other for limiting the rebound.

All of this is described below and illustrated in the drawing in which:—

Figure 1 is a fragmentary sectional view of one form of front mounting embodying this invention.

Figure 2 is a fragmentary end elevation of the construction shown in Figure 1.

Figure 3 is a fragmentary sectional view of another modified form of front mounting.

Figure 4 is an end elevation of the construction shown in Figure 3.

In Figures 1 and 2, the power plant is mounted upon the front cross member 4' of the frame by means of the seat 30, the cradle 31 and the rubber cushion 32. The rubber cushion is supported in the cradle 31 held in place by the plates 33, bolts 34, and nuts 35. The cradle 31 is also provided with the flanges 36 to position the cushion 32 and hold it in place longitudinally, keeping it from sliding out from between opposing surfaces of the seat 30 and cradle 31.

The cradle 31 is secured upon the frame cross member 4' by the bolts 37 and nuts 38.

The cushion rollers 39 and pins 40 are carried by the cradle 31 and by contact with the opposite surface of the seat 30 from the cushion 32, the rollers 39 act to prevent upward rebound movement of the power plant 2 away from the cradle 31.

The seat 30 is secured to the power plant 2 by the cap screws 41. It will be seen that by the curve of the cradle 31 and seat 30, the longitudinal axis of oscillation of the engine unit, designated C in Fig. 2 may be changed as desired. As shown, this point C is located directly above the crank shaft 42.

If the power plant 2 is not symmetrically weighted, the point C will naturally be displaced laterally as much as required to balance the engine upon its mountings.

In Figures 3 and 4, the construction is substantially the same as in Figures 1 and 2, except that it is inverted. The cradle 31' is secured to the engine unit or power-plant 2 by cap screws 41' and is faced downward with the rubber cushion 32' between the cradle 31' and the opposing surface of the seat 30'. The cradle 31' has a pin 40' secured thereto carrying a roller 39' engaging the opposite surface of the seat 30' for preventing rebound. The seat 30' is mounted on a bracket having projecting ears 33' and is secured to the bracket by bolts 34' and nuts 35' while the bracket is in turn secured to the cross-frame member 4' by bolts 37' and nuts 38'.

In both cases, the location of the cradle and the seat upon the frame and upon the power plant respectively and the curvature of these pieces combine to locate the point C as may be desired for any particular case.

Having now described my invention, what I claim as new and desire to protect by Letters Patent, is as follows:

1. A motor mounting comprising a seat to be secured to an engine unit and having a contacting surface, a cradle for the seat and having a contacting surface, cushion means interposed between the contacting surfaces of the cradle and seat and secured to the cradle for movement therewith relative to the seat, the contacting surfaces of the seat and cushion being curved, and means carried by the cradle and arranged to hold the seat in place on the cushion means for turning movement relative thereto.

2. A motor mounting comprising a seat having curved parallel surfaces, a cradle, a cushion secured to the cradle and having a curved contacting surface engaging one of the curved surfaces of the seat and conforming approximately to the curvature thereof, and a roller carried by the cradle and riding on the other curved surface of the seat for holding the cradle and seat in assembled relation.

3. A motor mounting comprising a seat having curved parallel surfaces, a cradle, a cushion having a curved contacting surface engaging one of the curved surfaces of the seat and conforming approximately to the curvature thereof, and means carried directly by the cradle and co-operating with the other curved surface of the seat for limiting the relative separation of the cradle and the seat.

4. A motor mounting comprising a seat having a load supporting surface and a rebound surface normally free of load, a support, a cushion supporting the seat on the support by contact with the load supporting surface of the seat, and rebound means carried directly by the support and cooperating with the rebound surface of the seat to limit the separation of the support and the seat.

5. An engine mounting comprising seat supporting means having a supporting surface, cradle supporting means having a supporting surface, a cushion having contact surfaces engaging the opposed supporting surfaces of the seat and cradle supporting means, one of said supporting means being free of the cushion and bodily movable transversely relative thereto, and means carried directly by one of said supporting means and co-operating with a surface of the other supporting means for limiting the relative separation of the supporting surfaces.

6. An engine mounting comprising seat supporting means having a supporting surface, cradle supporting means having a supporting surface, a cushion having contact surfaces engaging the opposed supporting surfaces of the seat and cradle supporting means, one of said supporting means being bodily movable transversely relative to the other and having means carried thereby for movement along a surface of the other supporting means for limiting the relative separation of the supporting surfaces.

7. A motor mounting comprising a seat having curved parallel surfaces, a cradle, a cushion having a curved contacting surface engaging one of the curved surfaces of the seat and conforming approximately to the curvature thereof, said seat and cradle being arranged for bodily transverse oscillatory movement of one thereof relative to the other, and means carried directly by the cradle and having relative transverse movement with respect to the other curved surface of the seat during said oscillatory movement for limiting the relative separation of the cradle and seat.

8. A motor mounting comprising a seat having a load supporting surface and a rebound surface normally free of load, a support, a cushion supporting the seat on the support by contact with the load supporting surface of the seat, said seat and support being arranged for bodily transverse oscillatory movement of one thereof relative to the other, and rebound means carried directly by the support and movable relative to the rebound surface of the seat and cooperating therewith to limit the separation of the support and seat.

9. An engine mounting comprising seat supporting means having a supporting surface, cradle supporting means having a supporting surface, said supporting surfaces being opposed, a cushion having contact surfaces bearing against the opposed supporting surfaces of the seat and cradle supporting means, and rebound means extending from one of said supporting means around the outside of the cushion to the other supporting means and cooperating therewith for limiting relative separation of the supporting surfaces.

10. An engine mounting comprising seat supporting means having a supporting surface, cradle supporting means having a supporting surface, said supporting surfaces being opposed, a cushion having contact surfaces bearing against the opposed supporting surfaces of the seat and cradle supporting means, and means straddling said cushion carried by one of said supporting means and having a portion thereof in position to engage a surface of the other supporting means for limiting relative separation of the supporting surfaces.

11. An engine mounting comprising a seat having arcuate parallel surfaces, a cradle, a cushion fixed to the cradle and bearing against one of the arcuate surfaces of the seat, and means carried by the cradle straddling the cushion and having a portion thereof in position to bear against the other arcuate surface of the seat for limiting relative separation of the cradle and seat.

12. The combination with an internal combustion engine unit having a cylinder block, of means for mounting said engine unit comprising seat supporting means having an arcuate supporting surface, cradle supporting means having an arcuate supporting surface, a cushion located substantially within the side lines of the cylinder block and having contact surfaces bearing against the supporting surfaces of the seat and cradle supporting means, one of said supporting means being bodily movable relative to the cushion, and means for limiting the relative separation of the supporting surfaces.

13. The combination with an internal combustion engine unit having a cylinder block, of means for mounting said engine unit comprising seat supporting means having an arcuate supporting surface, cradle supporting means having an arcuate supporting surface, said arcuate supporting surfaces being parallel and coaxial with the center therein within the confines of the end of the cylinder block, a cushion located substantially within the side lines of the cylinder block and having contact surfaces bearing against the supporting surfaces of the seat and cradle supporting means, one of said supporting means being bodily movable relative to the cushion.

14. The combination with an internal combustion engine unit having a cylinder block, of means for mounting said engine unit comprising seat supporting means having an arcuate supporting surface, cradle supporting means having an arcuate supporting surface, said arcuate supporting surfaces being parallel and coaxial with the center thereof within the confines of the end of the cylinder block, a cushion located substantially within the side lines of the cylinder block and having contact surfaces bearing against the supporting surfaces of the seat and cradle supporting means, one of said supporting means being bodily movable relative to the cushion, and rebound means carried by one of said supporting means and extending in position to engage the other to limit relative separation thereof.

15. The combination with an internal combustion engine unit, of means mounting said engine unit for oscillation about an axis extending lengthwise of the engine unit below the top thereof at the front of the engine unit, said mounting means comprising seat supporting means having a supporting surface, cradle supporting means having a supporting surface, one of said supporting means being connected with the engine unit, a cushion having contact surfaces engaging the opposed supporting surfaces of the seat and cradle supporting means, one of said supporting means being free of the cushion and bodily movable transversely relative thereto, and means carried directly by one of said supporting means and cooperating with a surface of the other supporting means for limiting the relative separation of the supporting surfaces.

ROLLAND S. TROTT.